United States Patent
Nasman et al.

(10) Patent No.: US 11,624,439 B2
(45) Date of Patent: Apr. 11, 2023

(54) RETAINER FOR SECURING A SEAL ELEMENT TO A SEAL CARRIER

(71) Applicant: Raytheon Technologies Corporation, Farmington, CT (US)

(72) Inventors: Benjamin Nasman, Tolland, CT (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 43 days.

(21) Appl. No.: 16/859,424

(22) Filed: Apr. 27, 2020

(65) Prior Publication Data
US 2021/0332886 A1    Oct. 28, 2021

(51) Int. Cl.
*F16J 15/08*    (2006.01)
*F02C 7/28*    (2006.01)

(52) U.S. Cl.
CPC .................. *F16J 15/08* (2013.01); *F02C 7/28* (2013.01); *F05D 2220/32* (2013.01); *F05D 2240/55* (2013.01)

(58) Field of Classification Search
CPC .......... F16J 15/00; F16J 15/08; F16J 15/0806; F16J 15/16; F16J 15/50; F16J 15/52; F02C 7/00; F02C 7/28; F05D 2220/32; F05D 2220/321; F05D 2220/3212; F05D 2220/3213; F05D 2220/3215–3219; F05D 2240/55
USPC ....................................................... 277/637
See application file for complete search history.

(56) References Cited

U.S. PATENT DOCUMENTS

| | | | |
|---|---|---|---|
| 3,698,725 A | 10/1972 | Klabunde | |
| 3,964,753 A | 6/1976 | Junker | |
| 4,406,459 A | 9/1983 | Davis | |
| 4,523,764 A | 6/1985 | Albers | |
| 4,905,637 A | 3/1990 | Ott | |
| 5,183,270 A * | 2/1993 | Alten | F16J 15/3452 277/405 |
| 5,464,227 A * | 11/1995 | Olson | F16J 15/3404 277/400 |
| 5,639,096 A * | 6/1997 | Ullah | F16J 15/3404 277/401 |
| 5,658,127 A | 8/1997 | Bond | |
| 5,791,205 A * | 8/1998 | Ruppert, Jr. | F16H 48/08 475/230 |
| 5,813,674 A | 9/1998 | Dickie | |
| 6,655,693 B2 | 12/2003 | Hosanna | |
| 6,758,598 B2 | 7/2004 | Beauvais | |
| 7,265,467 B2 | 9/2007 | Sumi | |
| 7,410,341 B2 | 8/2008 | Gockel | |

(Continued)

FOREIGN PATENT DOCUMENTS

CN    108644019 A    10/2018

OTHER PUBLICATIONS

EP search report for EP21169854.3 dated Sep. 1, 2021.

*Primary Examiner* — Nathan Cumar
(74) *Attorney, Agent, or Firm* — Getz Balich LLC

(57) ABSTRACT

An assembly is provided for rotational equipment. This assembly includes a seal carrier, a seal element and a retainer. The seal carrier is configured with a receptacle. The seal element is seated in the receptacle. The retainer is configured to secure the seal element to the seal carrier. The seal element is arranged radially between the seal carrier and the retainer.

15 Claims, 12 Drawing Sheets

(56) References Cited

U.S. PATENT DOCUMENTS

| | | |
|---|---|---|
| 7,998,238 B2 | 8/2011 | Takayama |
| 8,714,557 B2 * | 5/2014 | Miller .................. F16J 15/3472 |
| | | 277/377 |
| 8,845,282 B2 | 9/2014 | Lapierre |
| 8,920,034 B2 | 12/2014 | Galivel |
| 8,944,691 B2 | 2/2015 | Chumokhvalov |
| 10,288,163 B2 | 5/2019 | Miller |
| 10,344,679 B2 | 7/2019 | James |
| 11,187,093 B2 | 11/2021 | Trivedi |
| 2004/0154578 A1 | 8/2004 | Weaver |
| 2018/0195415 A1 | 7/2018 | Witlicki |
| 2018/0363781 A1 * | 12/2018 | Pehl ..................... F16J 15/3468 |

* cited by examiner

RETAINER FOR SECURING A SEAL ELEMENT TO A SEAL CARRIER

BACKGROUND OF THE DISCLOSURE

1. Technical Field

This disclosure relates generally to rotational equipment and, more particularly, to a seal assembly for the rotational equipment.

2. Background Information

Rotational equipment such as a gas turbine engine includes numerous seal assemblies to seal gaps between rotating and static components. Various types and configurations of seal assemblies are known in the art. While these known seal assemblies have various benefits, there is still room in the art for improvement. For example, there is a need in the art for a seal assembly with a more compact form. There is also a need in the art for a technique for securing a seal element to a seal carrier which reduces internal stresses within the seal element.

SUMMARY OF THE DISCLOSURE

According to an aspect of the present disclosure, an assembly is provided for rotational equipment. This assembly includes a seal carrier, a seal element and a retainer. The seal carrier is configured with a receptacle. The seal element is seated in the receptacle. The retainer is configured to secure the seal element to the seal carrier. The seal element is arranged radially between the seal carrier and the retainer.

According to another aspect of the present disclosure, another assembly is provided for rotational equipment. This assembly includes a seal carrier, a seal element and a retainer. The seal carrier includes a receptacle. The seal element is seated within the receptacle. The retainer is configured to secure the seal element to the seal carrier. The retainer includes a sleeve that axially overlaps the seal carrier and the retainer. The sleeve is radially inward of the seal element.

According to still another aspect of the present disclosure, another assembly is provided for rotational equipment. This assembly includes a seal carrier, a seal element and a retainer. The seal element is arranged with the seal carrier. The retainer is configured to axially secure the seal element to the seal carrier. The retainer includes a retainer sleeve and a retainer lip. The retainer sleeve is radially inboard of and axially overlaps the seal carrier and the seal element. The retainer sleeve is mounted to the seal carrier. The retainer lip projects radially out from the retainer sleeve. The seal element is captured axially between the retainer lip and the seal carrier.

The seal carrier, the seal element and the retainer may each extend circumferentially about an axial centerline.

The receptacle may extend partially axially into the seal carrier. The receptacle may extend partially radially into the seal carrier. The receptacle may extend within the seal carrier circumferentially about an axial centerline.

The seal element may be configured as or otherwise include a carbon seal element.

The seal element may circumscribe the retainer.

The retainer may axially overlap the seal element and the seal carrier.

The retainer may be configured to radially engage the seal element and the seal carrier.

The retainer may be attached to the seal carrier by a tight fit interface or a threaded interface between the retainer and the seal carrier.

The retainer may include a retainer sleeve and a retainer lip. The retainer sleeve may axially overlap the seal element and the seal carrier. The retainer lip may project radially out from the retainer sleeve and may radially overlap the seal element.

The retainer sleeve may radially engage the seal carrier. The retainer lip may axially engage the seal element.

The seal element may be axially captured between the retainer lip and the seal carrier.

The assembly may also include an anti-rotation feature configured to prevent or limit rotation of the seal element relative to the seal carrier.

The assembly may also include a seal land configured to rotate about an axial centerline. The seal land may be sealingly engaged with the seal element.

The assembly may also include a plurality of guide rails arranged in an array about an axial centerline. The seal carrier may be mated with and configured to translate axially along each of the guide rails.

The assembly may also include a static structure. Each of the guide rails may be attached to the static structure.

The assembly may also include a spring element axially engaged with and between the seal carrier and the static structure. The spring element may be configured to bias the seal element axially away from the static structure.

The sleeve may be configured to abut against the seal element and the seal carrier.

The seal element may be axially between the seal carrier and the retainer.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
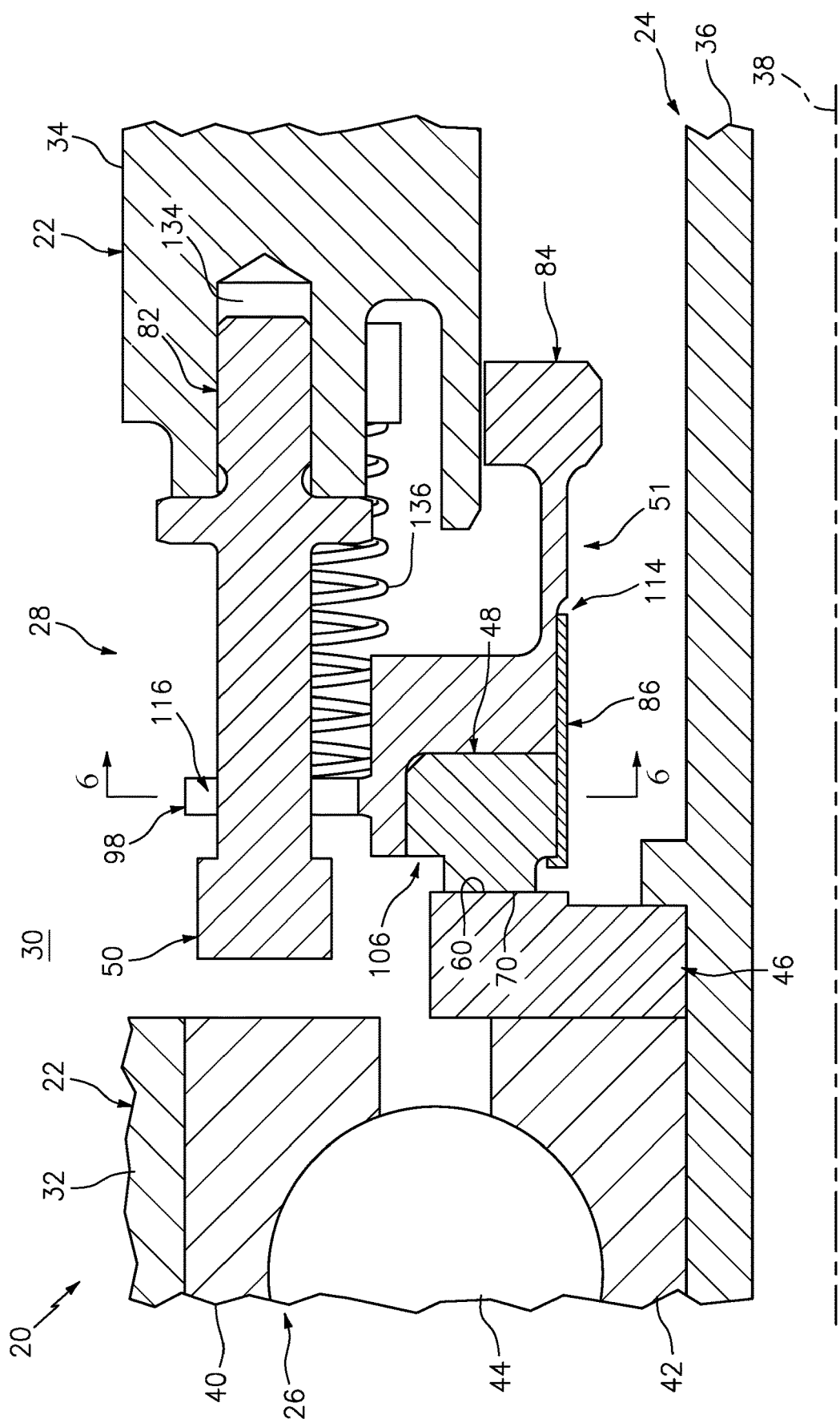
FIG. 1 is a partial side sectional illustration of an assembly for rotational equipment such as a gas turbine engine.

FIG. 1 is a partial side sectional illustration of an assembly 20 for a piece of rotational equipment. The rotational equipment may be configured as a gas turbine engine for an aircraft propulsion system such as, but not limited to, a geared or direct-drive turbofan gas turbine engine. However, the assembly 20 of the present disclosure is not limited to such an aircraft application nor a gas turbine engine application. The assembly 20, for example, may alternatively be configured with rotational equipment such as an industrial gas turbine engine, a wind turbine, a water turbine or any other apparatus which includes a seal assembly for sealing a gap between a rotating component and a static component.

The assembly 20 of FIG. 1 includes a static structure 22, a rotating assembly 24 and at least one bearing 26 for rotatably supporting the rotating assembly 24 relative to the static structure 22. The assembly 20 of FIG. 1 also includes a seal assembly 28 configured to seal an annular gap between the rotating assembly 24 and the static structure 22.

The static structure 22 is configured as a stationary part of the rotational equipment. The static structure 22 of FIG. 1, for example, is configured to at least partially form an internal bearing compartment 30 for housing at least the bearing 26. This static structure 22 includes a bearing support 32 such as, but not limited to, a strut. The static structure 22 also includes a seal assembly support 34; e.g., an annular wall.

The rotating assembly 24 of FIG. 1 includes at least a rotating structure 36. The rotating assembly 24 and its rotating structure 36 are each configured to rotate about an axial centerline 38, which centerline 38 may be an axial centerline and/or a central rotational axis of the rotational equipment. The rotating structure 36 of FIG. 1 is configured as a tubular shaft. However, in other embodiments, the rotating structure 36 may be configured as another component (e.g., a sleeve) mounted to and rotatable with a shaft of the rotational equipment, or any other rotor within the rotational equipment. The rotating structure 36 of FIG. 1 extends axially along the axial centerline 38 through (or partially into or within) the static structure 22. The static structure 22 of FIG. 1 thereby extends circumferentially about (e.g., completely around) the axial centerline 38 and the rotating assembly 24 and its rotating structure 36.

The bearing 26 may be configured as a roller element bearing. The bearing 26 of FIG. 1, for example, includes an annular outer race 40, an annular inner race 42 and a plurality of bearing elements 44; e.g., cylindrical or spherical elements. The outer race 40 circumscribes the inner race 42 and the bearing elements 44. The outer race 40 is mounted to the static structure 22 and, more particularly, the bearing support 32. The inner race 42 circumscribes and is mounted to the rotating structure 36. The bearing elements 44 are arranged in an annular array about the axial centerline 38, which array is radially between and engaged with the outer race 40 and the inner race 42. The present disclosure, however, is not limited to the foregoing exemplary bearing configuration. For example, in other embodiments, the bearing 26 may alternatively be configured as a journal bearing or any other type of bearing utilized in the rotational equipment.

The seal assembly 28 of FIG. 1 is configured to seal the gap which extends (e.g., radially and/or axially) between the static structure 22 and the rotating structure 36. Of course, in other embodiments, the seal assembly 28 may seal a gap extending between the static structure 22 and another rotating component mounted to and/or rotatable with the rotating structure 36.

The seal assembly 28 of FIG. 1 includes an annular (e.g., rotatable) seal land 46 and an annular (e.g., non-rotatable, stationary) seal element 48; e.g., a carbon seal element. The seal assembly 28 of FIG. 1 also includes one or more guide rails 50 and a seal support structure 51.

Figure 2:
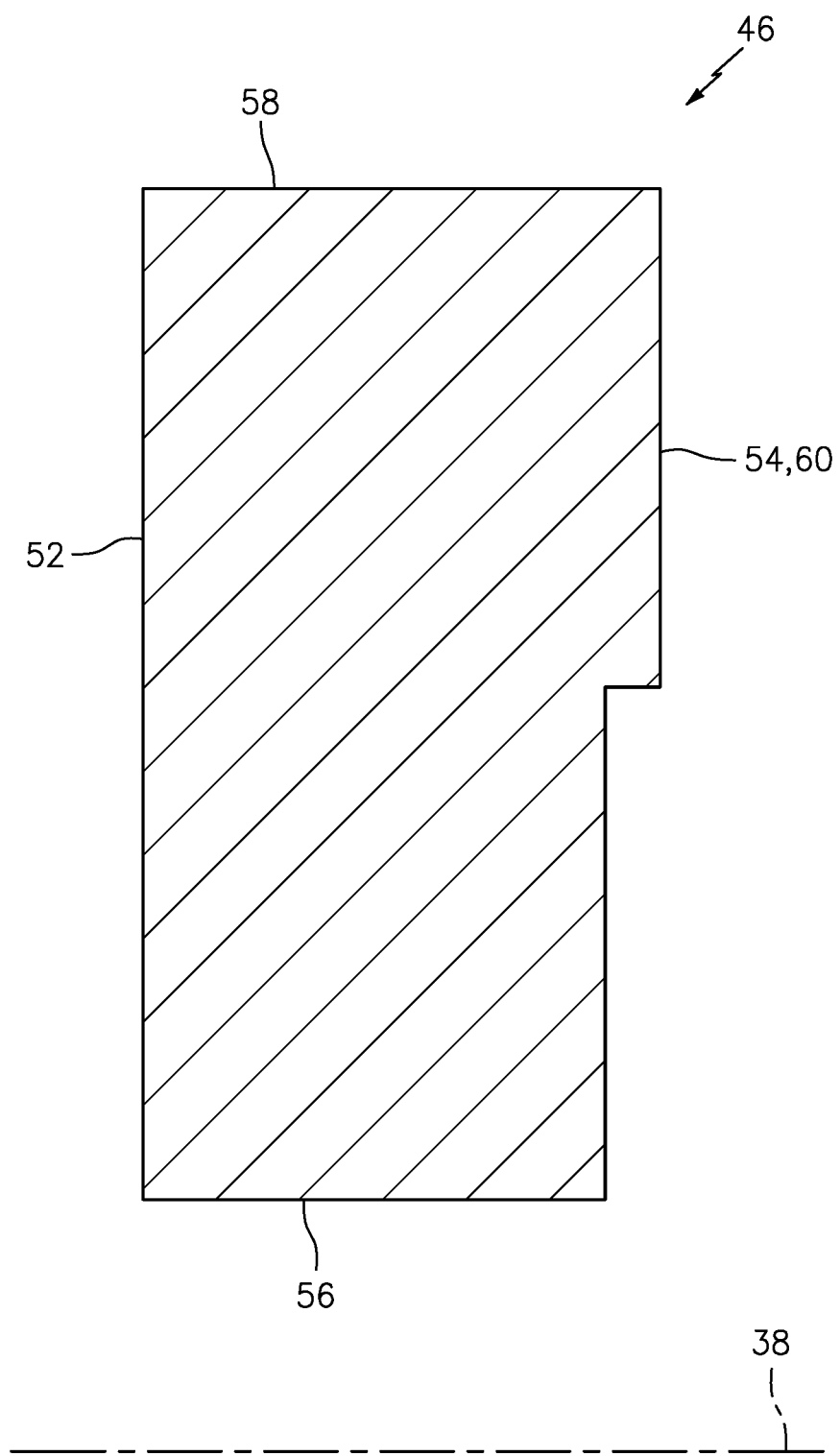
FIG. 2 is a partial side sectional illustration of a seal land.
Figure 3:
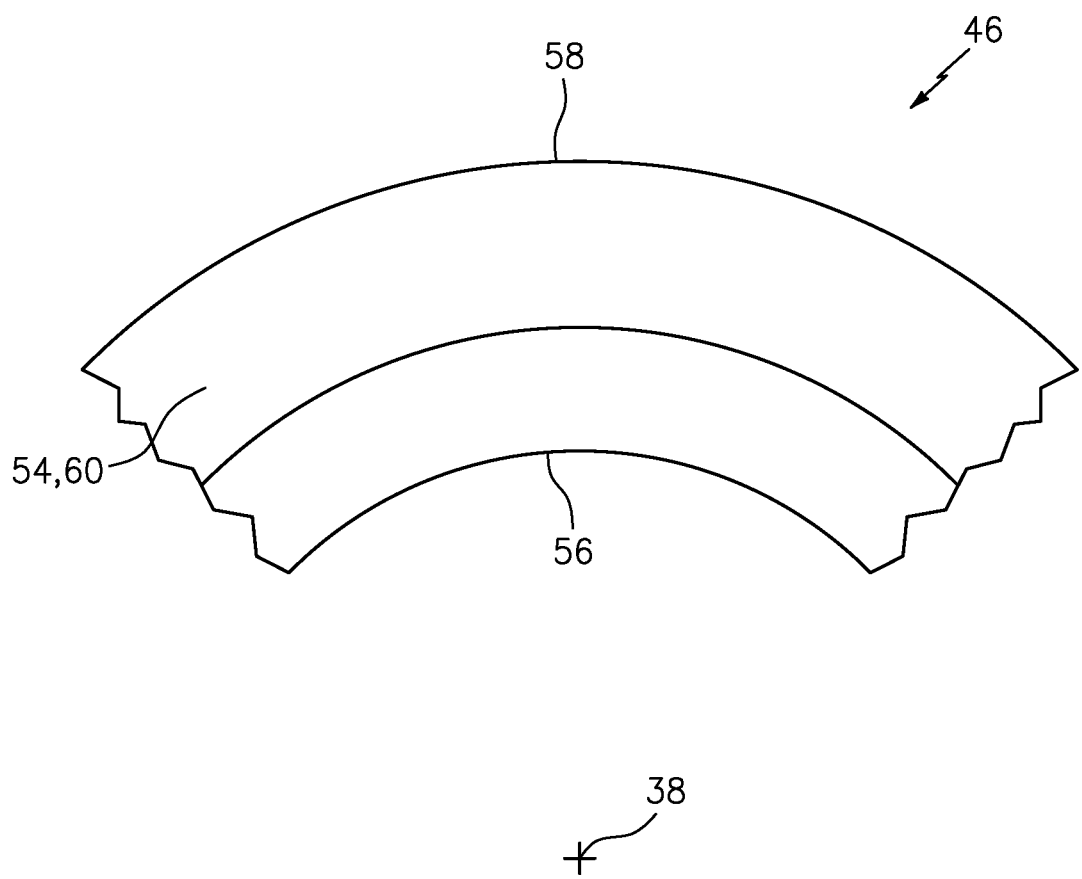
FIG. 3 is a partial end view of the seal land.

Referring to FIGS. 2 and 3, the seal land 46 extends circumferentially about (e.g., completely around) the axial centerline 38. The seal land 46 may thereby be configured with a full hoop body. Referring to FIG. 2, the seal land 46 extends axially along the axial centerline 38 between a (e.g., axial) seal land first end 52 and a (e.g., axial) seal land second end 54. The seal land 46 extends radially between a (e.g., radial) seal land inner side 56 and a (e.g., radial) seal land outer side 58.

The seal land 46 includes an annular (e.g., radially extending) seal land surface 60 located at (e.g., on, adjacent or proximate) the seal land second end 54. This seal land surface 60 may be a substantially uninterrupted surface; see also FIG. 3. The seal land surface 60, for example, may be a flat planar surface configured without (e.g., circumferential and/or radial) interruptions such as, but not limited to, channels, slots and apertures. Of course, in other embodiments, the seal land surface 60 may be (e.g., circumferentially and/or radially) interrupted by one or more channels, slots, apertures and/or other types of surface interruptions.

Figure 4:
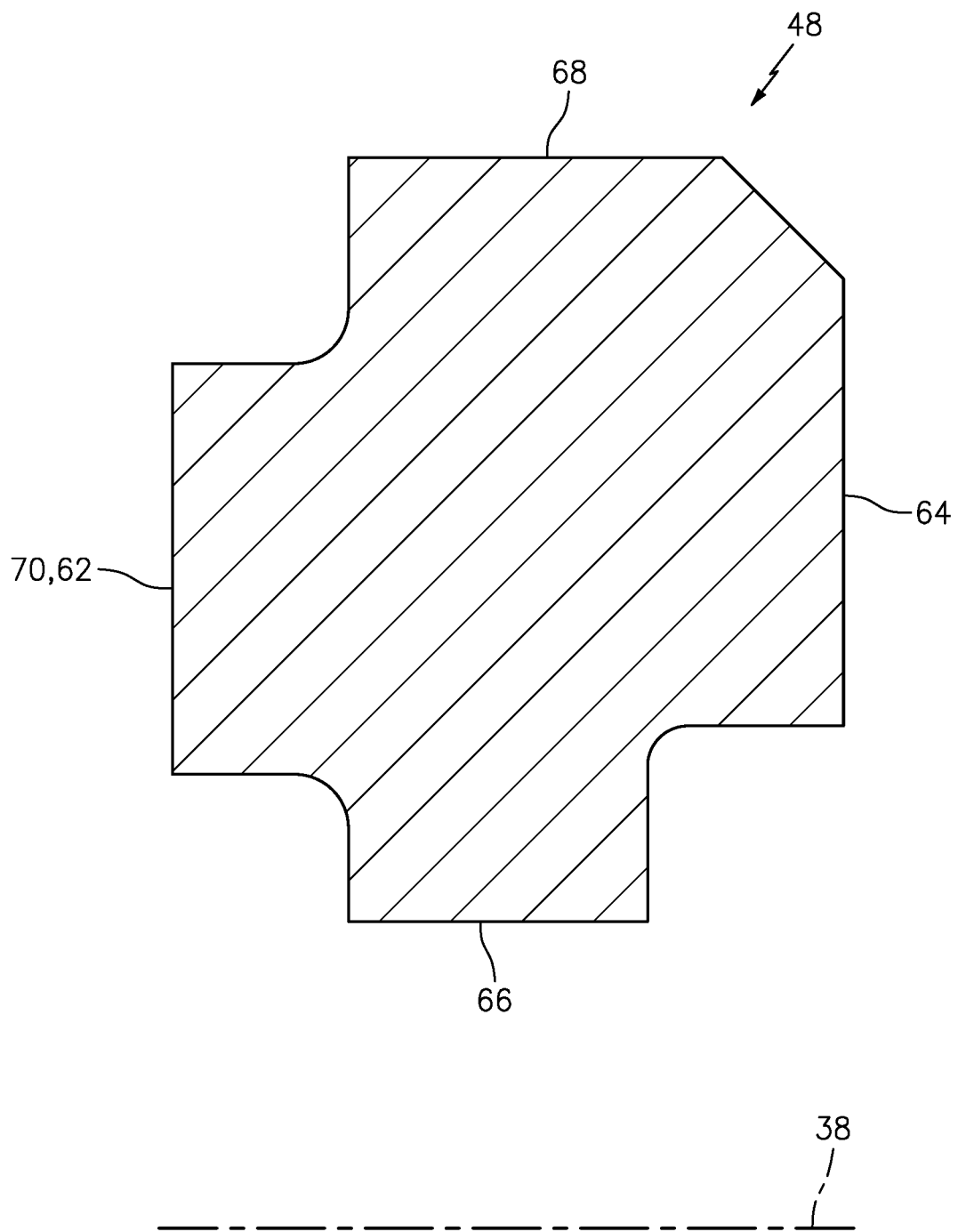
FIG. 4 is a partial side sectional illustration of a seal element.
Figure 5:
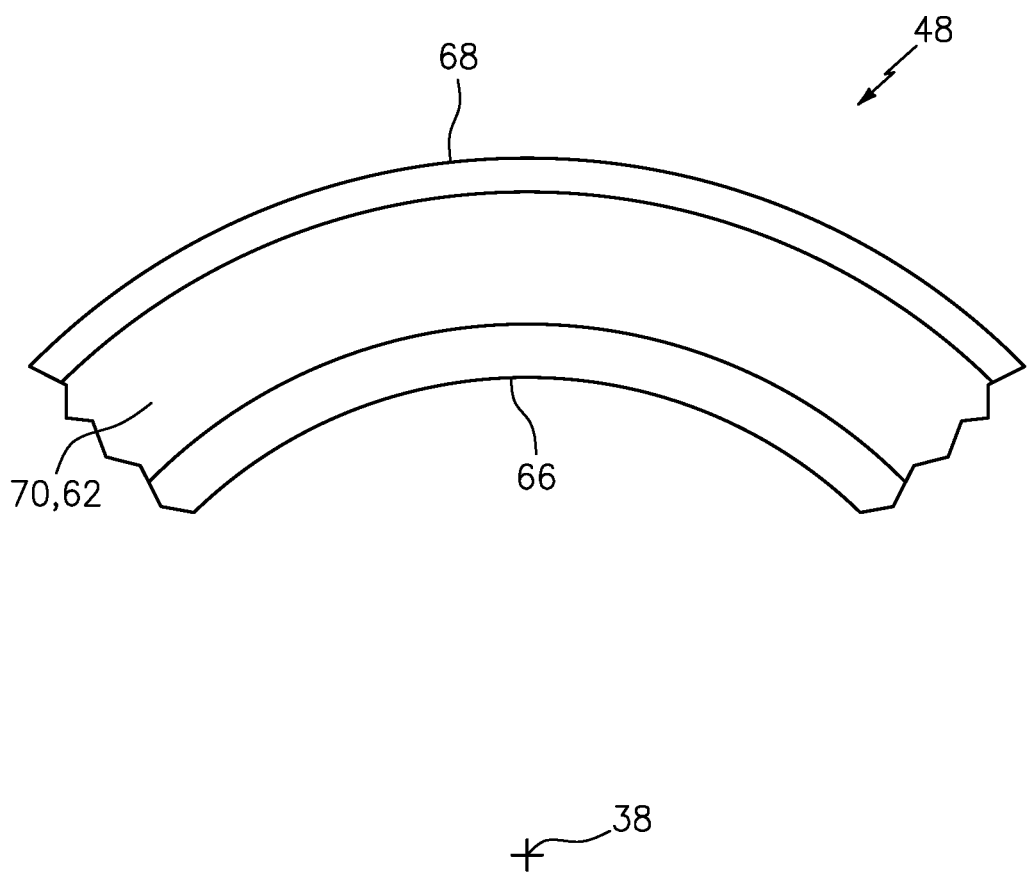
FIG. 5 is a partial end view illustration of the seal element.

Referring to FIGS. 4 and 5, the seal element 48 extends circumferentially about (e.g., completely around) the axial centerline 38. The seal element 48 may thereby be configured with a full hoop body. This full hoop body may be a single unitary body; e.g., a monolithic body. Alternatively, the full hoop body may be a segmented body; e.g., the seal element 48 may be configured from an array of arcuate seal element segments. Referring to FIG. 4, the seal element 48 extends axially along the axial centerline 38 between a (e.g., axial) seal element first end 62 and a (e.g., axial) seal element second end 64. The seal element 48 extends radially between a (e.g., radial) seal element inner side 66 and a (e.g., radial) seal element outer side 68.

The seal element 48 includes an annular (e.g., radially extending) seal element surface 70 located at (e.g., on, adjacent or proximate) the seal element first end 62. This seal element surface 70 is a substantially uninterrupted surface; see also FIG. 5. The seal element surface 70, for example, may be a flat planar surface configured without (e.g., circumferential and/or radial) interruptions such as, but not limited to, channels, slots and apertures. Of course, in other embodiments, the seal element surface 70 may be (e.g., circumferentially and/or radially) interrupted by one or more channels, slots, apertures and/or other types of surface interruptions.

Figure 6:
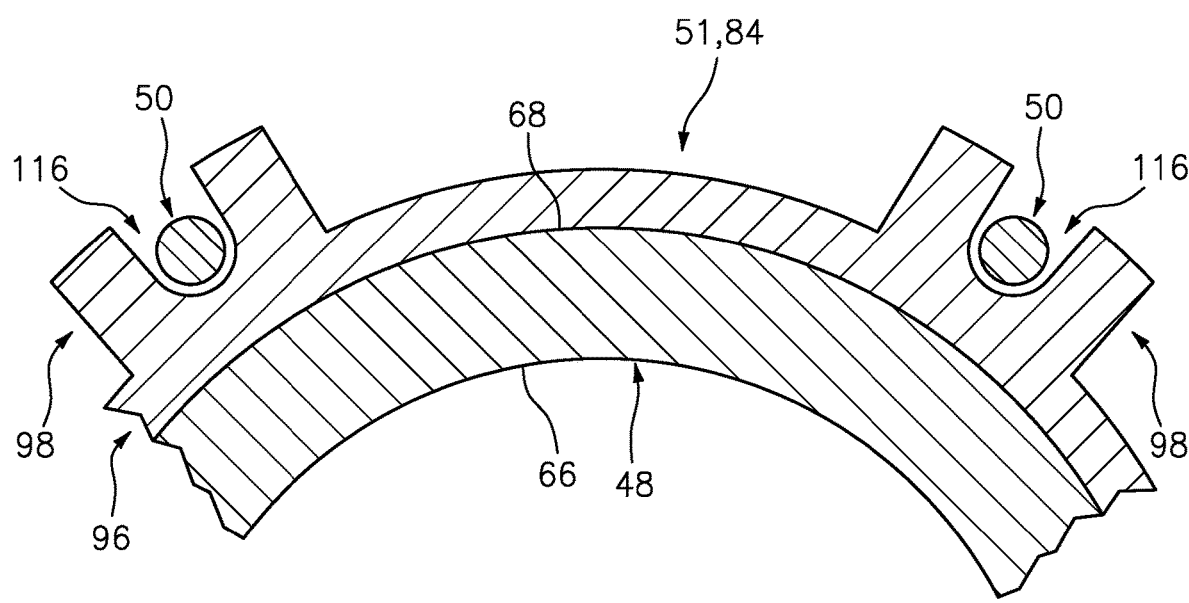
FIG. 6 is a cross-sectional illustration of a portion of the assembly of FIG. 1 along line 6-6.
Figure 7:
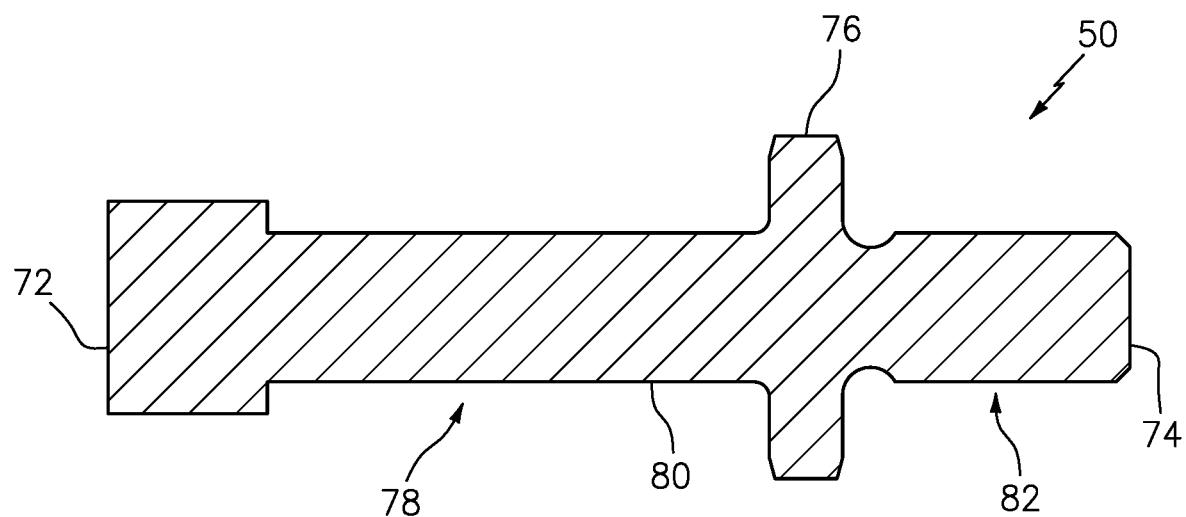
FIG. 7 is a side sectional illustration of a guide rail pin.

Referring to FIG. 6, the guide rails 50 are arranged circumferentially about the axial centerline 38 in an annular array. Referring to FIG. 7, each of the guide rails 50 may be configured as or otherwise include a guide pin. For example, each guide rail 50 of FIG. 7 may have, but is not limited to, a generally cylindrical body that extends axially between a (e.g., axial) guide rail first end 72 and a (e.g., axial) guide rail second end 74. A generally annular flange 76 may project out from and circumscribes the body. This flange 76 may be configured with a polygonal (e.g., hexagonal) peripheral cross-sectional geometry adapted for mating with an installation tool such as, but not limited to, a wrench or a socket. An axial first portion 78 of the body, axially between the guide rail first end 72 and the flange 76, may be configured with a smooth cylindrical surface 80. An axial second portion 82 of the body, axially between the guide rail second end 74 and the flange 76, may be configured with threads; e.g., the portion 82 is a threaded portion.

Referring to FIG. 1, the seal support structure 51 is configured to translate axially along the guide rails 50. The seal support structure 51 is also configured to support the seal element 48. The seal support structure 51 of FIG. 1 includes an annular seal carrier 84 and an annular seal element retainer 86.

Figure 8:
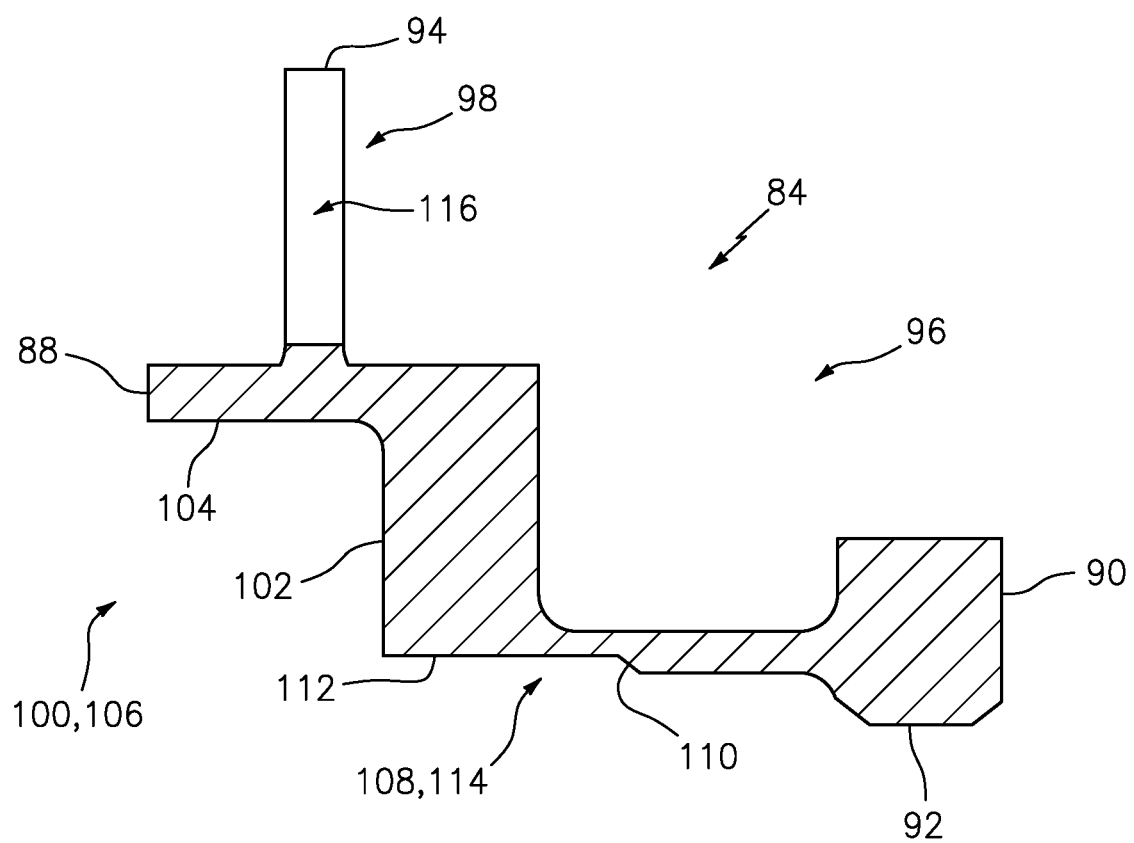
FIG. 8 is a partial side sectional illustration of a seal carrier.
Figure 9:
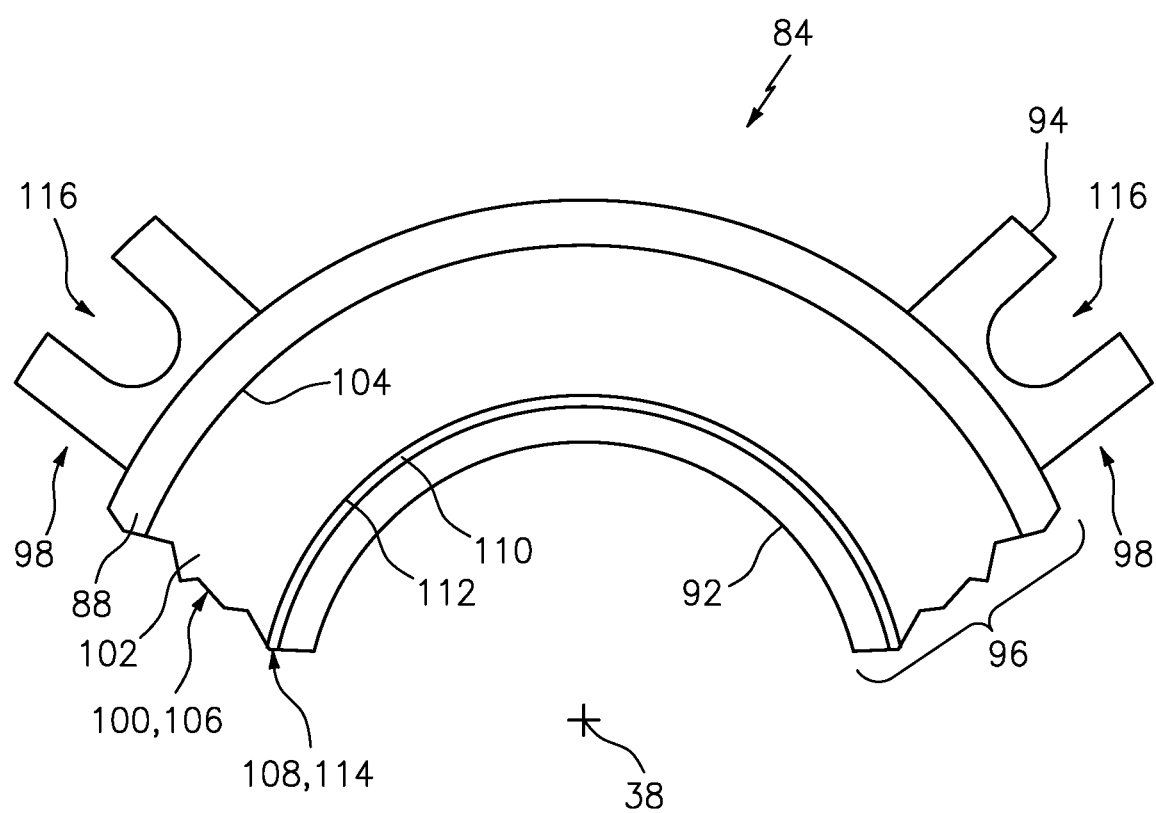
FIG. 9 is a partial end view illustration the seal carrier.

Referring to FIG. 8, the seal carrier 84 extends circumferentially about (e.g., completely around) the axial centerline 38; see also FIG. 9. The seal carrier 84 may thereby be configured with a full hoop body. The seal carrier 84 extends axially along the axial centerline 38 (not shown in FIG. 8 for ease of illustration) between a (e.g., axial) seal carrier first end 88 and a (e.g., axial) seal carrier second end 90. The seal carrier 84 extends radially between a (e.g., radial) seal carrier inner side 92 and a (e.g., radial) seal carrier outer side 94.

The seal carrier 84 of FIG. 8 includes a tubular seal carrier base 96 and one or more seal carrier flanges 98; see also FIGS. 6 and 9. The seal carrier base 96 is configured with an annular outer seal carrier recess/notch 100. This outer seal carrier recess 100 extends axially partially into the seal carrier base 96 from the seal carrier first end 88 to an (e.g., annular) outer axial end surface 102. The outer seal carrier recess 100 extends radially partially into the seal carrier base 96 from the seal carrier inner side 92 to a (e.g., tubular) outer radial end surface 104. The outer seal carrier recess 100 extends circumferentially within the seal carrier base 96 about (e.g., completely around) the axial centerline 38. The outer seal carrier recess 100 forms an outer seal carrier receptacle 106 for the seal element 48 as described below in further detail.

The seal carrier base 96 of FIG. 8 is also configured with an annular inner seal carrier recess/notch 108. This inner seal carrier recess 108 extends axially partially into the seal carrier base 96 from the outer axial end surface 102 to an (e.g., annular) inner axial end surface 110. The inner seal carrier recess 108 extends radially partially into the seal carrier base 96 from the seal carrier inner side 92 to a (e.g., tubular) inner radial end surface 112. The inner seal carrier recess 108 extends circumferentially within the seal carrier base 96 about (e.g., completely around) the axial centerline 38. The inner seal carrier recess 108 forms an inner seal carrier receptacle 114 for the retainer 86 as described below in further detail.

Referring to FIG. 9, the seal carrier flanges 98 are arranged circumferentially about the seal carrier base 96. Each seal carrier flange 98 includes a flange aperture 116 such as, but not limited to, a slot, channel, groove, etc. Each flange aperture 116 of FIGS. 8 and 9 extends axially through and radially into the respective seal carrier flange 98.

Figure 10:
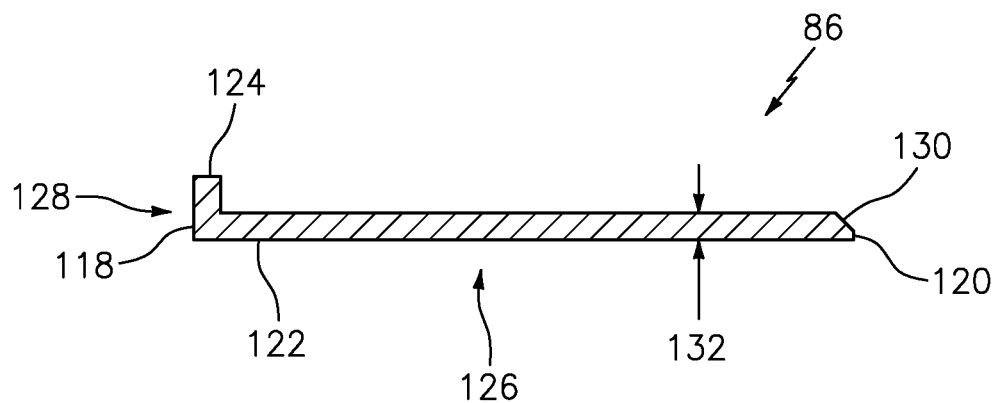
FIG. 10 is a partial side sectional illustration of a retainer.
Figure 11:
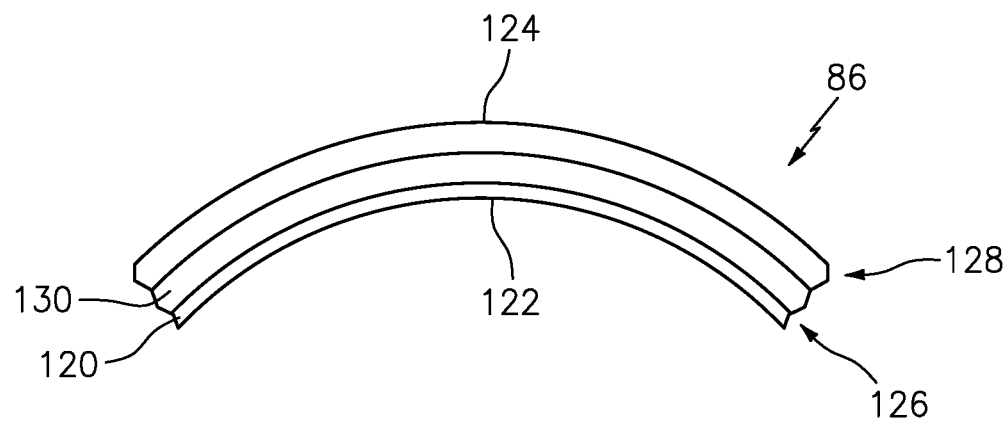
FIG. 11 is a partial end view illustration of the retainer.

Referring to FIG. 10, the retainer 86 is configured to (e.g., axially) secure the seal element 48 with the seal carrier 84 as described below in further detail. The retainer 86 extends circumferentially about (e.g., completely around) the axial centerline 38; see also FIG. 11. The retainer 86 may thereby be configured with a full hoop body. The retainer 86 extends axially along the axial centerline 38 between a (e.g., axial) retainer first end 118 and a (e.g., axial) retainer second end 120. The retainer 86 extends radially between a (e.g., radial) retainer inner side 122 and a (e.g., radial) retainer outer side 124.

The retainer 86 of FIG. 10 includes a tubular retainer sleeve 126 and an annular retainer lip 128; e.g., rim, flange, projection, etc. The retainer sleeve 126 extends axially along the axial centerline 38 between the retainer first end 118 and the retainer second end 120. The retainer sleeve 126 is located at the retainer inner side 122. At the retainer second end 120, the retainer sleeve 126 may be configured with a chamfered (or otherwise eased) outer corner 130. With such a configuration, a (e.g., radial) thickness 132 of the retainer sleeve 126 may increase as the sleeve 126 extends axially away from the retainer second end 120. However, the thickness 132 of a major portion (e.g., more than 85-95%) of the retainer sleeve 126 may be uniform (e.g., constant). The present disclosure, of course, is not limited to the foregoing exemplary retainer sleeve configuration.

The retainer lip 128 is located at the retainer first end 118. The retainer lip 128 projects radially out from the retainer sleeve 126 to a distal lip end at the retainer outer side 124.

Referring to FIG. 1, the seal land 46 is arranged with the rotating structure 36 in such a manner so as to be rotatable with the rotating structure 36 about the axial centerline 38. The seal land 46 of FIG. 1, for example, circumscribes and is fixedly mounted to the rotating structure 36.

The guide rails 50 are fixedly mounted to the static structure 22. For example, the threaded portion 82 of each guide rail 50 may be screwed into a corresponding tapped hole 134 in the static structure 22. Each guide rail 50 is thereby connected to the static structure 22 by a threaded interface. However, in other embodiments, one, some or each guide rail 50 may alternatively be connected to the static structure 22 through staking, riveting, etc.

Figure 12:
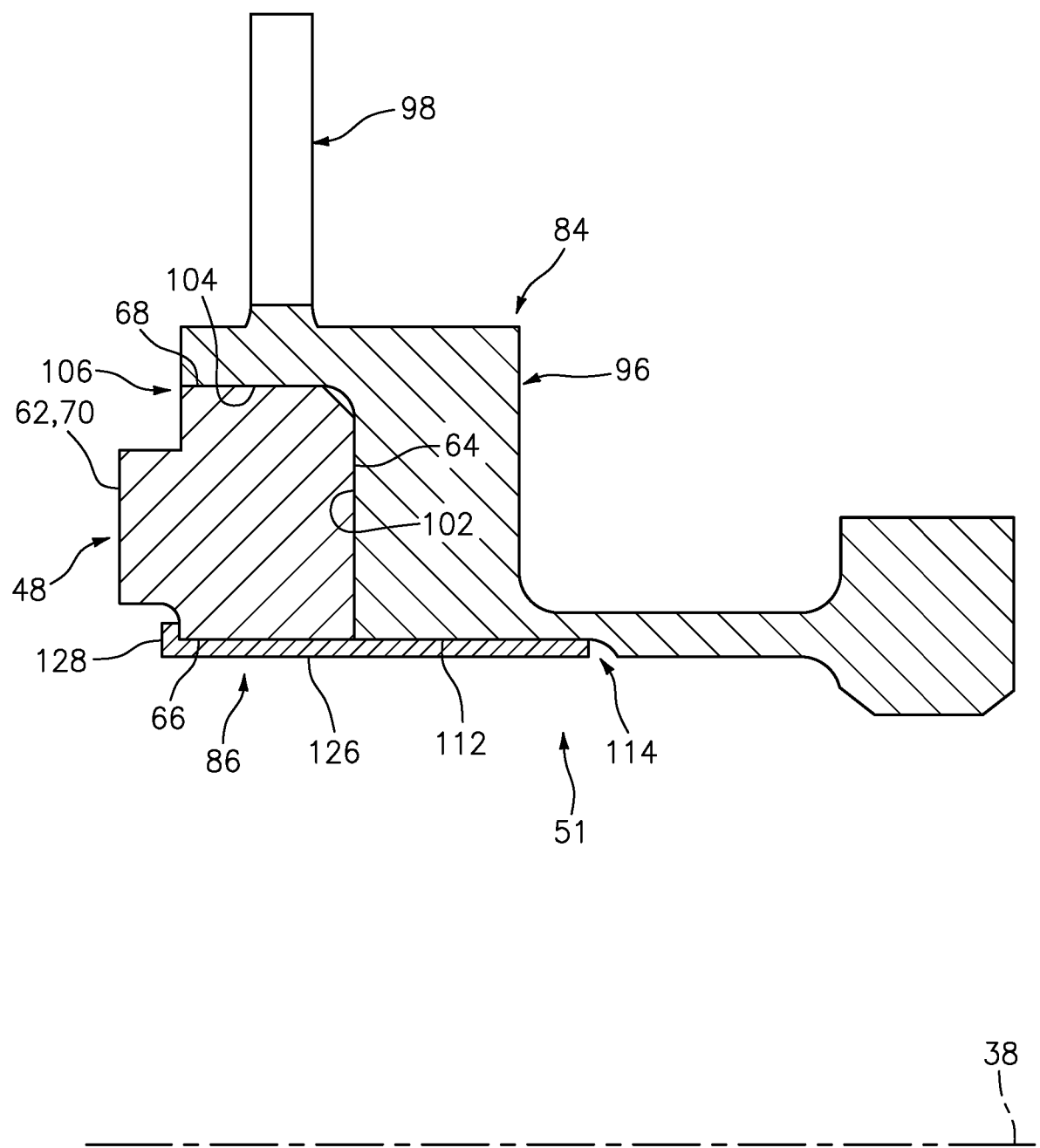
FIG. 12 is a partial side sectional illustration of a seal support structure mated with the seal element.

Referring to FIG. 12, the seal element 48 is seated in the outer seal carrier receptacle 106. The seal element 48, for example, is translated (e.g., slid) axially along the axial centerline 38 into the outer seal carrier receptacle 106 until, for example, the seal element second end 64 is axially engaged with (e.g., contacts) and/or abutted axially against the outer axial end surface 102. The seal element outer side 68 may also engage with (e.g., contact) and/or abut radially against the outer radial end surface 104.

The retainer 86 may subsequently be mated with the seal carrier 84 to (e.g., axially) secure the seal element 48 to the seal carrier 84. The retainer 86, for example, is translated (e.g., slid) axially along the axial centerline 38 such that the retainer sleeve 126 is mated with (e.g., projects into) the inner seal carrier receptacle 114 until, for example, the retainer lip 128 is axially engaged with (e.g., contacts) and/or is abutted axially against the seal element 48. With this arrangement, the seal element 48 is axially captured (e.g., sandwiched, locked, etc.) between the retainer lip 128 and the outer axial end surface 102 of the seal carrier 84.

The retainer sleeve 126 is attached to the seal carrier base 96. The retainer sleeve 126, for example, may engage the seal carrier base 96 through a tight fit (e.g., press fit, interference fit, etc.) interface between the retainer sleeve 126 and the seal carrier base 96. For example, an outer diameter of the retainer sleeve 126 may be sized to be slightly larger than an inner diameter of the inner radial end surface 112 such that retainer sleeve 126 and the seal carrier base 96 radially press against one another when the sleeve 126 is mated with the base 96. Of course, in other embodiments, the retainer 86 may be attached to the seal carrier 84 using additional or alternative mounting techniques. For example, the retainer sleeve 126 may be attached to the seal carrier base 96 through a threaded interface between the sleeve 126 and the base 96.

While the retainer sleeve 126 may radially engage (e.g., contact) the seal element 48, this engagement need not be a tight fit. For example, in some embodiments, there may be a slight radial gap between the retainer sleeve 126 and the seal element 48 to accommodate expansion during operation. Thus, the seal element 48 may be secured to the seal carrier 84 without a tight fit interface between, for example, the seal element 48 and another component (e.g., the seal carrier 84 or the retainer 86). As a result, internal stress within the seal element 48 may be reduced, which may in turn reduce design requirements for the seal element 48 and/or prolong the working life of the seal element 48.

With the foregoing arrangement, the retainer 86 and its sleeve 126 are arranged radially inboard/inward of the seal element 48 and the seal carrier 84 and its base 96. The retainer 86 and its sleeve 126 axially overlap and may radially engage the seal element 48 and the seal carrier 84 and its base 96. The seal element 48 and the seal carrier 84 and its base 96 may each thereby circumscribe the retainer 86 and its sleeve 126. By positioning the retainer 86 in this fashion, the size of the seal support structure 51 may be reduced.

Referring to FIG. 1, the seal carrier 84 is mated with the guide rails 50. In particular, each of the guide rails 50 projects through a respective flange aperture 116; see also FIG. 6. In this manner, the seal support structure 51 translatably (e.g., slidably), but non-rotatably, couples the seal element 48 with the static structure 22.

One or more spring elements 136 (e.g., coil springs) may be arranged between the static structure 22 and the seal carrier 84. These spring elements 136 are configured to bias the seal carrier 84 and, thus, the seal element 48 away from the static structure 22 and towards the seal land 46. In particular, the spring elements 136 cause the surfaces 60 and 70 to axially abut and sealingly engage (e.g., contact) one another.

Figure 13:
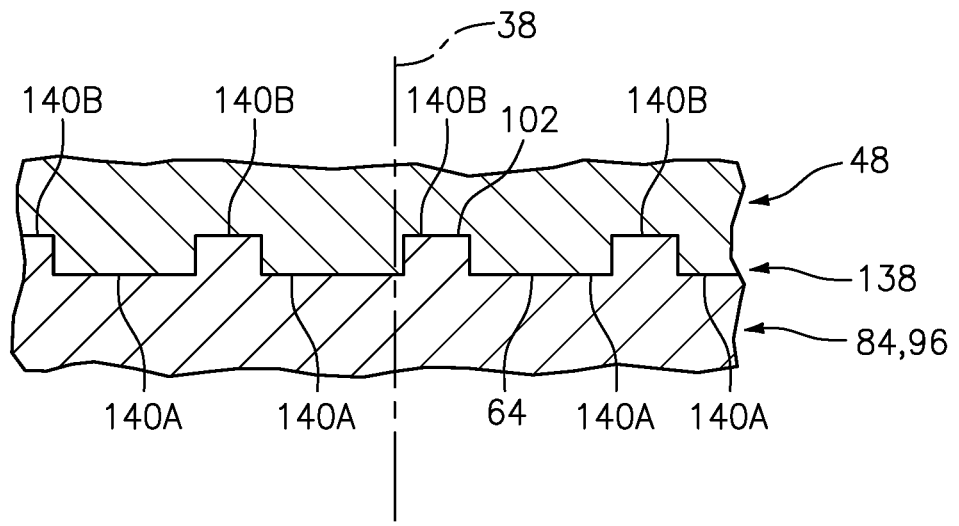
FIG. 13 is a partial sectional illustration of an interface between the seal element and the seal carrier.
Figure 14:
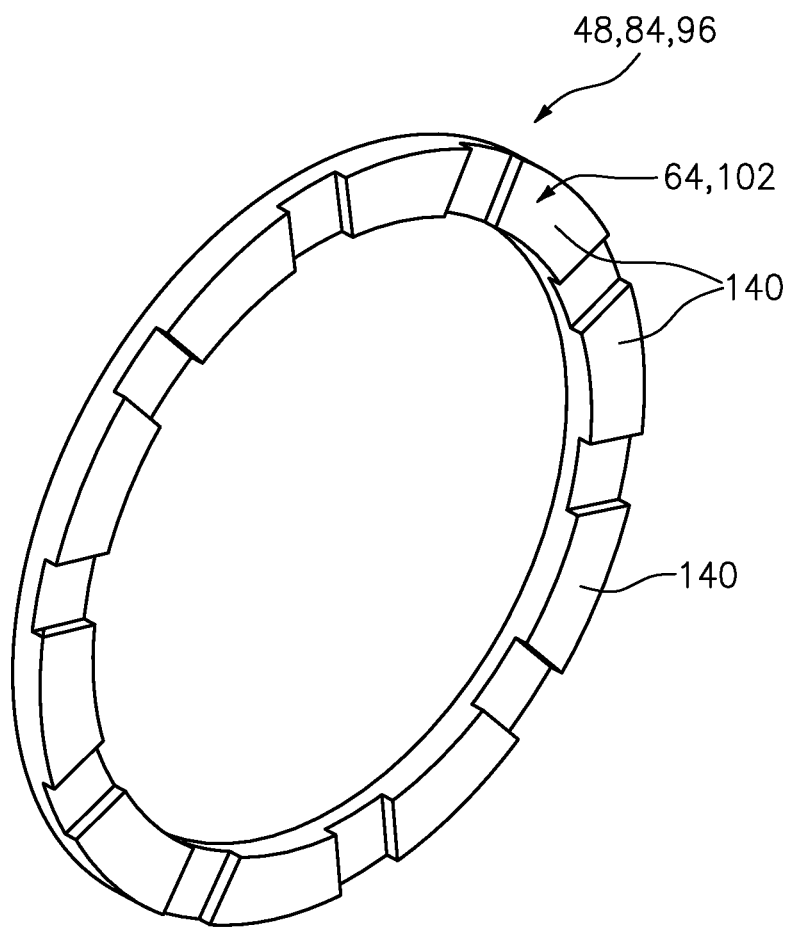
FIG. 14 is a perspective illustration of a select portion of a component such as the seal element or the seal carrier.

In some embodiments, referring to FIG. 13, an anti-rotation feature 138 may be provided between the seal element 48 and the seal carrier 84. The anti-rotation feature 138 of FIG. 13, for example, includes a plurality of interlocking projections 140A and 140B (generally referred to as "140"). A first set of the projections 140A are configured with the seal element 48 and a second set of the projections 140B are configured with the seal carrier 84. For example, each component 48, 84 may be configured with a castellated surface as shown in FIG. 14. Referring again to FIG. 13, each of the first projections 140A is meshed between (e.g., projects into a channel form by) a laterally (e.g., circumferentially or tangentially) neighboring pair of the second projections 140B. Similarly, each of the second projections 140B is meshed between (e.g., projects into a channel form by) a laterally (e.g., circumferentially or tangentially) neighboring pair of the first projections 140A. With this arrangement, the interlocked/meshed projections 140 may prevent (or limit) rotation of the seal element 48 about the axial centerline 38 relative to the seal carrier 84, and vice versa. The present disclosure, however, is not limited to the foregoing exemplary anti-rotation feature configuration. For example, in other embodiments, the components 48 and 84 of FIG. 12 may also or alternatively have a slight tight fit, etc.

Figure 15:
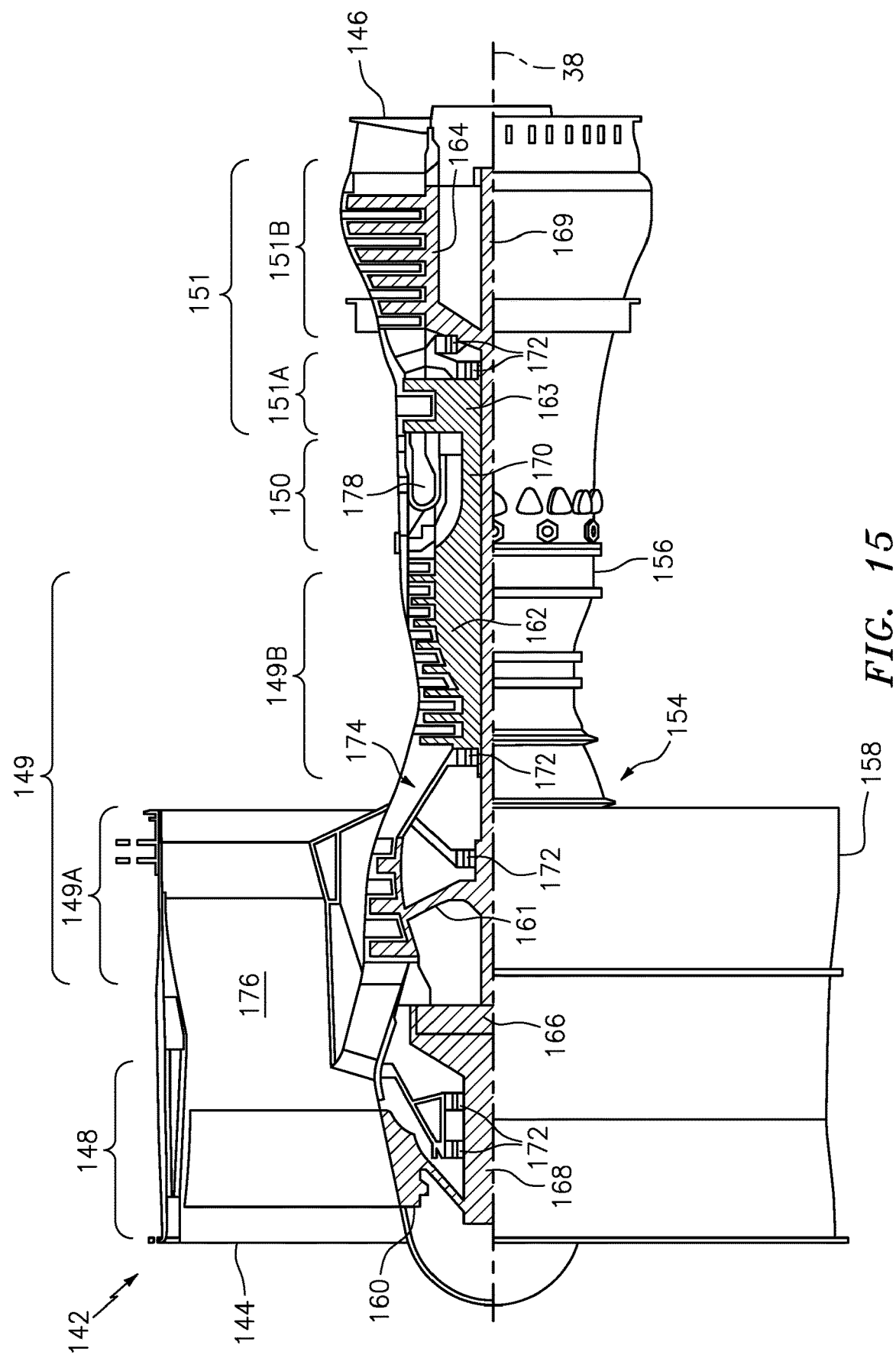
FIG. 15 is a side cutaway illustration of a geared turbine engine with which the assembly of FIG. 1 may be configured.

FIG. 15 is a side cutaway illustration of a geared turbine engine 142 with which the assembly 20 of FIG. 1 may be configured. The turbine engine 142 extends along an axial centerline (e.g., the centerline 38) between an upstream airflow inlet 144 and a downstream airflow exhaust 146. The turbine engine 142 includes a fan section 148, a compressor section 149, a combustor section 150 and a turbine section 151. The compressor section 149 includes a low pressure compressor (LPC) section 149A and a high pressure compressor (HPC) section 149B. The turbine section 151 includes a high pressure turbine (HPT) section 151A and a low pressure turbine (LPT) section 151B.

The engine sections 148-151B are arranged sequentially along the axial centerline 38 within an engine housing 154. This engine housing 154 includes an inner case 156 (e.g., a core case) and an outer case 158 (e.g., a fan case). The inner case 156 may house one or more of the engine sections 149A-151B; e.g., an engine core. This inner case 156 may include or may be connected to the static structure 22 of FIG. 1. The outer case 158 may house at least the fan section 148.

Each of the engine sections 148, 149A, 149B, 151A and 151B includes a respective rotor 160-164. Each of these rotors 160-164 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 160 is connected to a gear train 166, for example, through a fan shaft 168. The gear train 166 and the LPC rotor 161 are connected to and driven by the LPT rotor 164 through a low speed shaft 169. The HPC rotor 162 is connected to and driven by the HPT rotor 163 through a high speed shaft 170. The shafts 168-170 are rotatably supported by a plurality of bearings 172; e.g., rolling element and/or thrust bearings. Each of these bearings 172 is connected to the engine housing 154 by at least one stationary structure such as, for example, an annular support strut. The rotating structure 36 of FIG. 1 may be configured as any one of the shafts 168-170 or a component mounted thereto or otherwise rotatable therewith, and the bearing 26 of FIG. 1 may be configured as any one of the bearings 172.

During operation, air enters the turbine engine 142 through the airflow inlet 144. This air is directed through the fan section 148 and into a core gas path 174 and a bypass gas path 176. The core gas path 174 extends sequentially through the engine sections 149A-151B. The air within the core gas path 174 may be referred to as "core air". The bypass gas path 176 extends through a bypass duct, which bypasses the engine core. The air within the bypass gas path 176 may be referred to as "bypass air".

The core air is compressed by the compressor rotors 161 and 162 and directed into a combustion chamber 178 of a combustor in the combustor section 150. Fuel is injected into the combustion chamber 178 and mixed with the compressed core air to provide a fuel-air mixture. This fuel air mixture is ignited and combustion products thereof flow through and sequentially cause the turbine rotors 163 and 164 to rotate. The rotation of the turbine rotors 163 and 164 respectively drive rotation of the compressor rotors 162 and 161 and, thus, compression of the air received from a core airflow inlet. The rotation of the turbine rotor 164 also drives rotation of the fan rotor 160, which propels bypass air through and out of the bypass gas path 176. The propulsion of the bypass air may account for a majority of thrust generated by the turbine engine 142, e.g., more than seventy-five percent (75%) of engine thrust. The turbine engine 142 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
   a seal carrier configured with a receptacle;
   a seal element seated in the receptacle;
   a retainer configured to secure the seal element to the seal carrier, wherein the seal element is arranged radially between and contacts the seal carrier and the retainer; and
   a seal land configured to rotate about an axial centerline, the seal land sealing engaged with the seal element.

2. The assembly of claim 1, wherein the seal carrier, the seal element and the retainer each extend circumferentially about an axial centerline.

3. The assembly of claim 1, wherein
   the receptacle extends partially axially into the seal carrier;
   the receptacle extends partially radially into the seal carrier; and
   the receptacle extends within the seal carrier circumferentially about an axial centerline.

4. The assembly of claim 1, wherein the seal element comprises a carbon seal element.

5. The assembly of claim 1, wherein the seal element circumscribes the retainer.

6. The assembly of claim 1, wherein the retainer axially overlaps the seal element and the seal carrier.

7. The assembly of claim 1, wherein the retainer is configured to radially engage the seal element and the seal carrier.

8. The assembly of claim 1, wherein the retainer is attached to the seal carrier by a tight fit interface or a threaded interface between the retainer and the seal carrier.

9. The assembly of claim 1, wherein
   the retainer comprises a retainer sleeve and a retainer lip;
   the retainer sleeve axially overlaps the seal element and the seal carrier; and
   the retainer lip projects radially out from the retainer sleeve and radially overlaps the seal element.

10. The assembly of claim 9, wherein
    the retainer sleeve radially engages the seal carrier; and
    the retainer lip axially engages the seal element.

11. The assembly of claim 9, wherein the seal element is axially captured between the retainer lip and the seal carrier.

12. The assembly of claim 1, further comprising an anti-rotation feature configured to prevent or limit rotation of the seal element relative to the seal carrier.

13. The assembly of claim 1, further comprising:
    a plurality of guide rails arranged in an array about an axial centerline;
    the seal carrier mated with and configured to translate axially along each of the plurality of guide rails.

14. The assembly of claim 13, further comprising:
    a static structure;
    each of the plurality of guide rails attached to the static structure.

15. The assembly of claim 14, further comprising a coil spring axially engaged with and between the seal carrier and the static structure, the coil spring configured to bias the seal element axially away from the static structure.

* * * * *